US009358652B2

(12) United States Patent
Stiefel et al.

(10) Patent No.: US 9,358,652 B2
(45) Date of Patent: Jun. 7, 2016

(54) TOOL TURRET

(75) Inventors: Jürgen Stiefel, Kohlberg (DE); Dietmar Linder, Dettingen (DE); Günther Schips, Pfullingen (DE)

(73) Assignee: SAUTER FEINMECHANIK GMBH, Metzingen (DE)

( * ) Notice: Subject to any disclaimer, the term of this patent is extended or adjusted under 35 U.S.C. 154(b) by 881 days.

(21) Appl. No.: 13/261,479

(22) PCT Filed: May 17, 2011

(86) PCT No.: PCT/EP2011/002429
§ 371 (c)(1),
(2), (4) Date: Oct. 18, 2012

(87) PCT Pub. No.: WO2011/147544
PCT Pub. Date: Dec. 1, 2011

(65) Prior Publication Data
US 2013/0074301 A1    Mar. 28, 2013

(30) Foreign Application Priority Data

May 28, 2010  (DE) .......................... 10 2010 021 948
May 28, 2010  (DE) .......................... 10 2010 021 949

(51) Int. Cl.
*B23B 29/32*    (2006.01)
*B23Q 5/04*    (2006.01)
(Continued)

(52) U.S. Cl.
CPC ................ *B23Q 16/02* (2013.01); *B23B 29/32* (2013.01); *B23B 29/323* (2013.01);
(Continued)

(58) Field of Classification Search
CPC ............ Y10T 29/5155; Y10T 29/5154; Y10T 408/37; Y10T 82/2587; B23B 29/32; B23B 29/323

USPC ............. 29/40, 39; 408/35; 82/159; 74/813 R
See application file for complete search history.

(56) References Cited

U.S. PATENT DOCUMENTS 4,847,960 A * 7/1989 Hafla ...................... B23B 3/162
29/40
5,065,492 A * 11/1991 Von Haas .............. B23B 29/046
29/39
(Continued)

FOREIGN PATENT DOCUMENTS

DE        37 22 643 C1    10/1988
DE        38 33 511 C2     4/1990
(Continued)

OTHER PUBLICATIONS

Machine Translation of JP 05-038607-A, which JP '607 was published Feb. 1993.*

*Primary Examiner* — Erica E Cadugan
(74) *Attorney, Agent, or Firm* — Wenderoth, Lind & Ponack, L.L.P.

(57) ABSTRACT

A tool turret includes a tool disk (2) swivelable about a support column (32) that defines a swivel axis (26) into positions in which at least one machining tool fastened to the tool disk (2) is in a machining position. A drive device (14) includes drives (10, 8) connected by a controllable coupling device (18) to outputs (20, 22) used to drive the tool disk (2) or the machining tool. The drive device (14) is arranged inside the tool disk (2) together with the drives (8, 10) and the output (22) used to drive the machining tool. The output used to drive the tool disk (2) in a swiveling manner has a gear train arrangement (34) outside the tool disk (2) on the support column (32). The gear train arrangement has an output shaft (70) that extends along the support column (32).

9 Claims, 4 Drawing Sheets

(51) Int. Cl.
 *B23Q 16/02* (2006.01)
 *B23B 31/107* (2006.01)
 *B23Q 11/04* (2006.01)
 *B23Q 16/10* (2006.01)

(52) U.S. Cl.
 CPC .............. *B23B 31/1076* (2013.01); *B23Q 5/04* (2013.01); *B23Q 11/04* (2013.01); *B23Q 16/025* (2013.01); *B23Q 16/10* (2013.01); *B23Q 2220/002* (2013.01); *Y10T 29/5154* (2015.01); *Y10T 29/5155* (2015.01); *Y10T 74/14* (2015.01); *Y10T 82/2587* (2015.01)

(56) References Cited

U.S. PATENT DOCUMENTS

| | | | | |
|---|---|---|---|---|
| 5,655,988 | A * | 8/1997 | Schnell | F16H 1/28 475/311 |
| 5,745,967 | A * | 5/1998 | Kojima | B23Q 5/048 29/40 |
| 5,910,066 | A * | 6/1999 | Schulz | F16H 1/2863 475/331 |
| 6,722,005 | B2 * | 4/2004 | Sauter | B23Q 16/102 29/39 |
| 6,925,694 | B2 * | 8/2005 | Sauter | B23Q 39/02 29/39 |
| 7,475,463 | B1 | 1/2009 | Chang et al. | |
| 7,971,328 | B2 * | 7/2011 | Sahm | B23Q 5/04 29/40 |
| 9,089,940 | B2 * | 7/2015 | Linder | B23Q 5/04 |
| 2006/0064861 | A1 * | 3/2006 | Ishiguro | B23Q 39/02 29/40 |
| 2013/0055538 | A1 * | 3/2013 | Stiefel | B23B 29/32 29/39 |

FOREIGN PATENT DOCUMENTS

| | | | |
|---|---|---|---|
| DE | 198 38 505 | A1 | 3/2000 |
| DE | 101 30 446 | A1 | 1/2003 |
| DE | 10 2007 061 793 | B3 | 2/2009 |
| EP | 0 732 171 | A1 | 9/1996 |
| EP | 0 674 122 | B1 | 7/1998 |
| EP | 0799 663 | B1 | 7/1999 |
| EP | 2 185 318 | B1 | 3/2011 |
| JP | 05-038607 | A * | 2/1993 |
| WO | WO-2011/035866 | A1 * | 3/2011 |

* cited by examiner

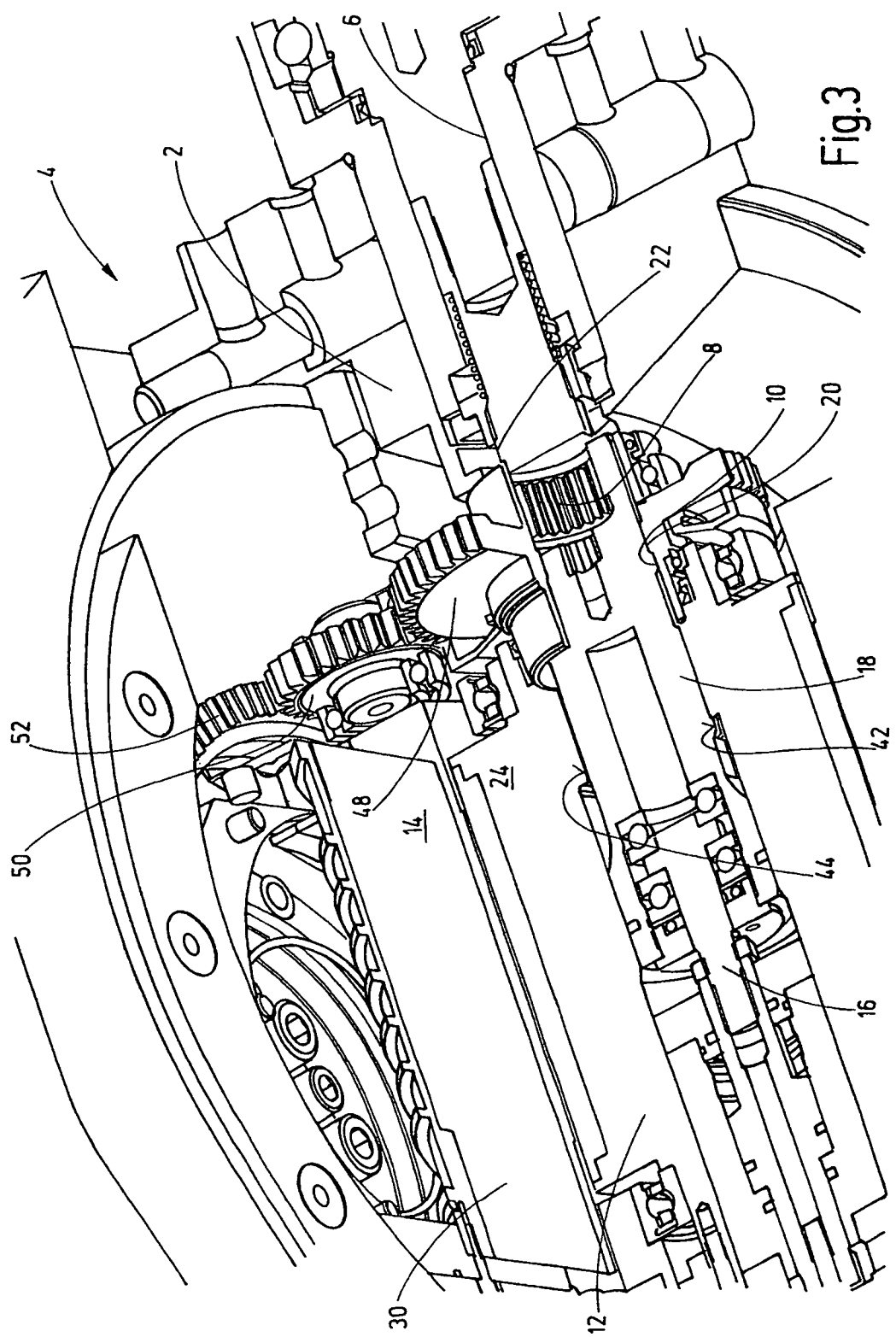

TOOL TURRET

FIELD OF THE INVENTION

The invention relates to a tool turret comprising a tool disk, which can be swiveled around a support column, defining a swivel axis, into positions in which at least one machining tool fastened to the tool disk is in a machining position. A drive device having two drives can be connected to respective outputs used to drive the tool disk or the machining tool by a controllable coupling device.

BACKGROUND OF THE INVENTION

Such tool turrets are used in industrial manufacturing, especially if the objective is to be able to not only swivel the tool disk to select the machining tool required for the current machining operation, but also to drive a rotating machining tool by a common drive device.

U.S. Pat. No. 7,475,463 B1 discloses a cutting machine tool that uses a common drive device that selectively drives a tool disk or a rotating machining tool fastened to the tool disk by a holding mechanism. The prior art solution provides that a shaft driven by the drive device and provided with two drives in the form of teeth arranged so as to be axially offset relative to each other. The drive device is moved into a first or second axial position for the purpose of selectively driving the tool disk or the machining tool. In a first axial position of the shaft, the first drive of the shaft is uncoupled from the first output for driving the machining tool, and the second drive in the form of external teeth is in engagement with an output permitting the tool disk to be swiveled. In a second axial position of the shaft, the first drive provided on the shaft for driving the machining tool is brought into engagement with the drive for driving the machining tool, so that the machining tool can be moved rotationally. The prior art solution is relatively large in size, so that the tool turret has the drawback that its range of application is extremely limited.

SUMMARY OF THE INVENTION

An object of the present invention is to provide an improved tool turret distinguished by a simple, compact, and reliable design that meets the tight manufacturing tolerances necessary in industrial manufacturing when the tool turret is in operation.

The present invention basically achieves this object with a tool turret having a drive device arranged inside the tool disk together with the drive and the output used to drive the machining tool, while the output used to drive the tool disk in a swiveling manner is connectable to gear train arrangement found outside the tool disk on the support column. The gear train arrangement has an output shaft that extends along the support column. The result is an extremely compact design of the whole system of the tool turret, including a tool disk and a support column. Since the output for driving the tool disk in a swiveling manner is arranged with the gear train arrangement and the output shaft outside the tool disk on the support column, the tool disk can be designed to be extremely compact, even though it houses a common drive for swivel motions and the drive of a rotary tool. In this case, the rotary tool drive is used, as it were, as the direct drive of the machining tool, while the swivel drive is shifted to the support column with the result that the mass of the gear train arrangement of the swivel drive does not act on the mass of the tool disk itself.

Highly advantageously, that the gear train arrangement can have a Wolfrom planetary gear. Since a Wolfrom planetary gear will ensure a very high transmission ratio even in the case of the smallest possible space requirement, the support column, too, needs only a small amount of installation space to transform the relatively high speed of the drive shaft of the drive device, as required for the direct drive of the machining tool, into the comparatively low speed of the output shaft provided for the swivel drive.

In the case of drives to be driven by a common drive shaft of the drive device, the coupling device for the selective coupling with the drive for the swivel drive and with the drive of the machining tool can be controlled by an actuating device. By the actuating device, the respective drives can be displaced coaxially to the drive shaft of the drive device or parallel thereto. A coaxially displaceable arrangement of the respective drive relative to the drive shaft has only, on the one hand, a minimum installation space requirement. In addition, the coaxial arrangement permits the drive shaft of the drive device to directly drive the drives with zero backlash.

In a preferred exemplary embodiment, the second drive is arranged coaxially to the first drive inside the receiving space in the tool disk. The coaxial arrangement of the second drive to the first drive permits a space saving design.

In a preferred exemplary embodiment, the coupling device, comprising the two drives, is mounted on the drive shaft in a rotationally rigid manner and can be displaced axially relative to the drive shaft. The rotationally rigid connection of the coupling device to the drive shaft ensures the transmission of the torques from the drive device to the coupling device. The axial displaceability of the coupling device on the drive shaft permits the assigned axial positions of the coupling device for the selective drive of the tool disk or the machining tool.

In a preferred exemplary embodiment, the actuating device of the coupling device includes a hydraulic cylinder surrounded at least in sections by the drive shaft. In the actuated state, the coupling device connects the respective drive inside the receiving space in the direction of the output shaft of the machining tool to be driven. In the non-actuated state, the coupling device moves in the opposite direction for the swivel drive of the tool disk. The implementation of the actuating device by a hydraulic cylinder supports a compact design. Moreover, this arrangement ensures for the cylindrically configured drives that a uniformly distributed infeed force can be applied in a ring-shaped manner to the drives by the hydraulic cylinder, so that a canting or blocking of the drives during the infeed operation is largely ruled out.

A preferred exemplary embodiment provides that the tool disk can be secured in a defined manner in its predefinable swivel positions relative to the support column by a locking device. A defined securing in predefinable swivel positions is absolutely mandatory for machining workpieces with a high degree of precision, because, for example, in machining operations very high forces may occur at the machining tool. Even under such loads, the machining tool, which is fastened to the tool disk by the holding mechanism, remains stable in its intended position owing to the locking device. An especially advantageous embodiment can provide for the locking device, a so-called Hirth coupling, that in the case of a very stable locking in the locked state allows a nevertheless adequately high resolution swiveling of the tool disk.

With respect to an extremely compact design of the support column, the hollow shafts that extend coaxially to each other along the support column can form the drive shaft and the output shaft of the Wolfrom planetary gear that may be found at a distance from the tool disk.

Other objects, advantages and salient features of the present invention will become apparent from the following detailed description, which, taken in conjunction with the annexed drawings, discloses a preferred embodiment of the present invention.

BRIEF DESCRIPTION OF THE DRAWINGS

Referring to the drawings that form a part of this disclosure:

FIG. 3 is a perspective view (partially cut open) of the tool disk of FIGS. 1A and 1B, with the operating state of the activated swivel drive being shown.

DETAILED DESCRIPTION OF THE INVENTION

Figure 1A:
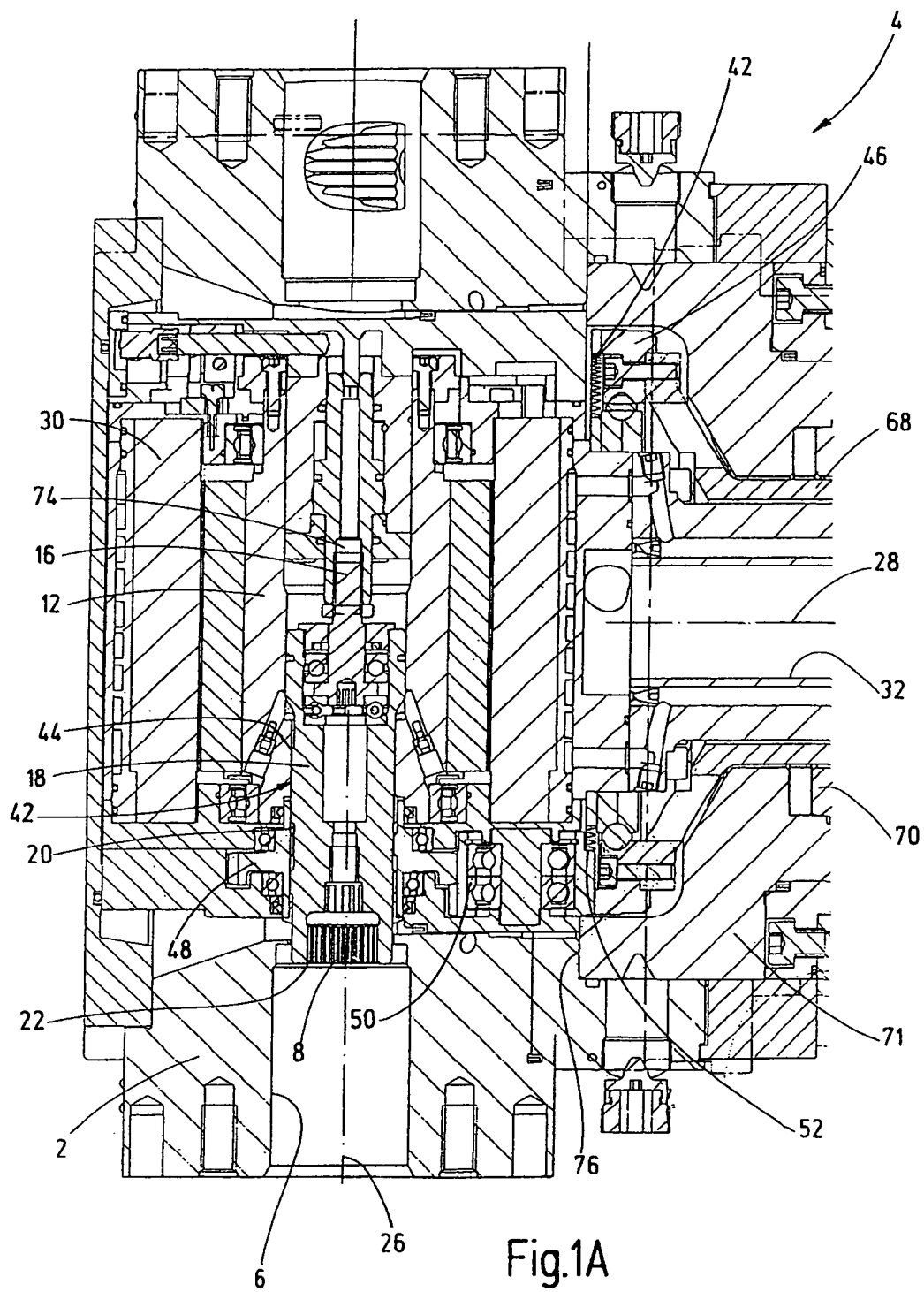
FIG. 1A is a side view in section a center section of a tool turret according to an exemplary embodiment of the invention, showing the region of the tool disk with an adjoining part of the support column.

In the exemplary embodiment of the tool turret 4 shown in the figures, a drive device 14 is provided for the selective swivel drive of a tool disk 2 and the rotary drive of at least one machining tool (not illustrated), which machining tool can be fastened to the tool disk 2 by a holding mechanism 6. The drive is implemented by first and second drives 10, 8 that can be driven by the common drive device 14 having a drive shaft 12. The first and second drives 10, 8 can be connected to the first and second outputs 20, 22, respectively, by a coupling device 18 that can be controlled by at least one actuating device 16. The first output 20 is used to drive the tool disk 2, while the second output 22 is used to drive the machining tool. The drive device 14 is arranged completely inside the tool disk 2 together with the drives 8, 10 and the second output 22 used to drive the machining tool. The first output 20 used to drive the tool disk 2 in a swiveling manner, is not directly—that is, inside the tool disk 2—in drive connection with this tool disk, but rather can be operatively connected to the tool disk 2 by a gear train arrangement 34 found outside the tool disk 2 on the support column 32 of the tool turret 4. This gear train arrangement is configured in the form of a Wolfrom planetary gear 34 and is arranged on the support column 32, defining the swivel axis of the tool disk 2, at a distance from the tool disk 2, as described in greater detail below. The drive device 14 is arranged together with the drives 8, 10 inside the tool disk 2 inside a receiving space 24 of the tool disk 2.

The actuating device 16 permits the respective drives 8, 10 to be arranged coaxially to the drive shaft 12 of the drive device 14. The coupling device 18, comprising the two drives 8 and 10, is mounted on the drive shaft 12 such that it is rotationally rigid or fixed, but axially displaceable relative to the drive shaft 12 in the direction of the center axis 26 of the coupling device 18.

When the machining tool, fastened to the tool disk by the holding mechanism 6, is adjusted into a machining position by the swivel motion of the tool disk around a swivel axis 28, the coupling device 18 is actuated such that the coupling device 18 is fed or moved from the position shown in FIG. 3 to the right, in order to drive the machining tool by coupling the second drive 8 with the second output 22. On the other hand, in order to drive the tool disk 2 in a swiveling manner, the coupling device 18 is in the axial position that is shown in FIG. 3 and also in the other figures. At the same time, when the coupling device 18 is rotationally moved by the drive device 14, the rotational motion is transferred to a gearwheel 48 by the first drive 10 that is in engagement with the first output 20 when the coupling device 18 is in this position. An intermediate gearwheel 50 that meshes with the gearwheel 48 continues the drive connection to the planetary gear 34 arranged on the support column 32.

In the depicted exemplary embodiment, the force is transferred from the drive shaft 12 to the coupling device 18 by the outer peripheral-side teeth 42 of the coupling device 18 that mesh with the inner peripheral-side teeth 44 in a recess of the drive shaft 12. To displace the coupling device 18 into the respective switching or axial positions, the actuating device 16 has a hydraulic cylinder 74.

Figure 1B:
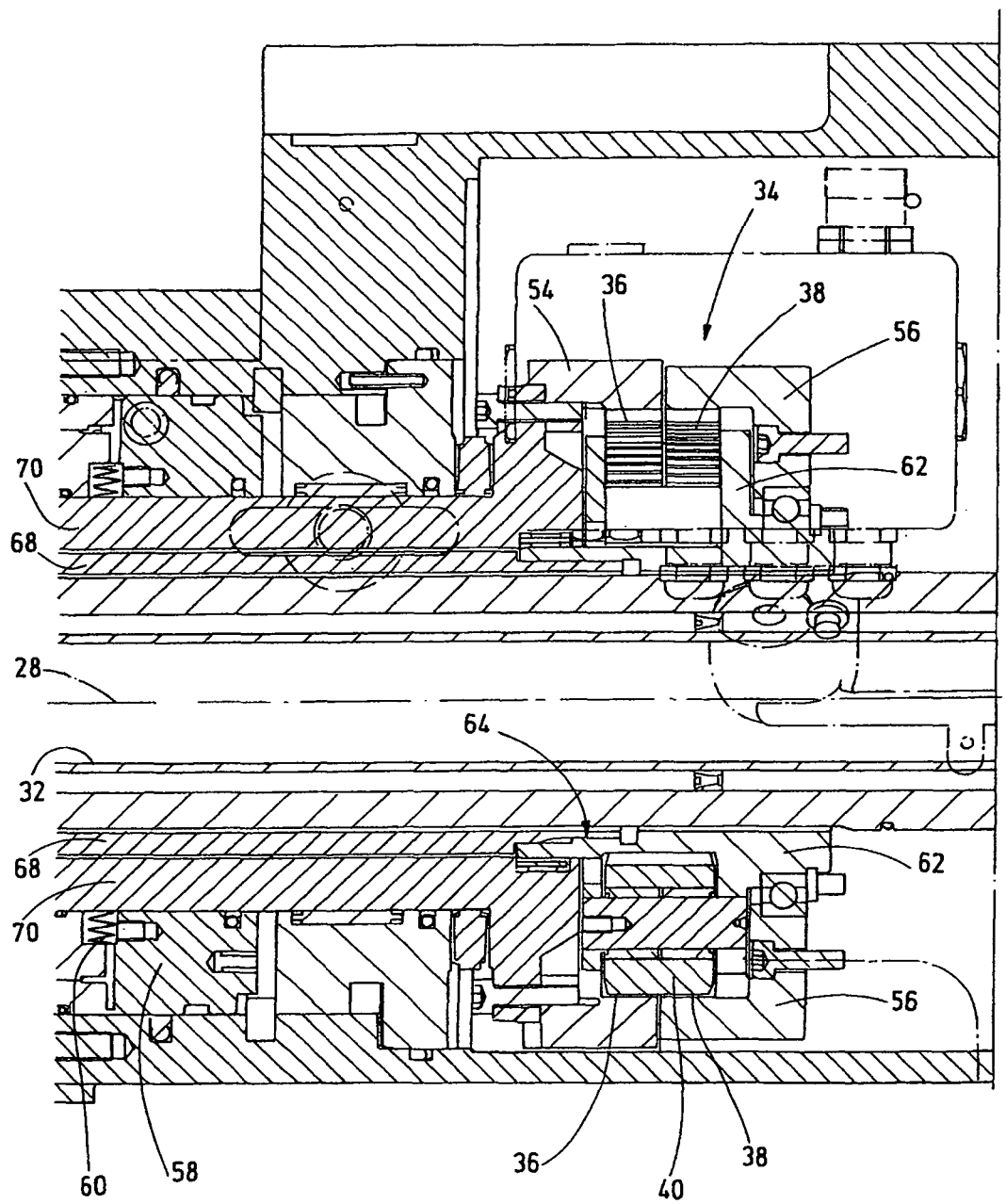
FIG. 1B is a side view in section of the tool turret of FIG. 1A showing the remaining section of the support column.
Figure 2:
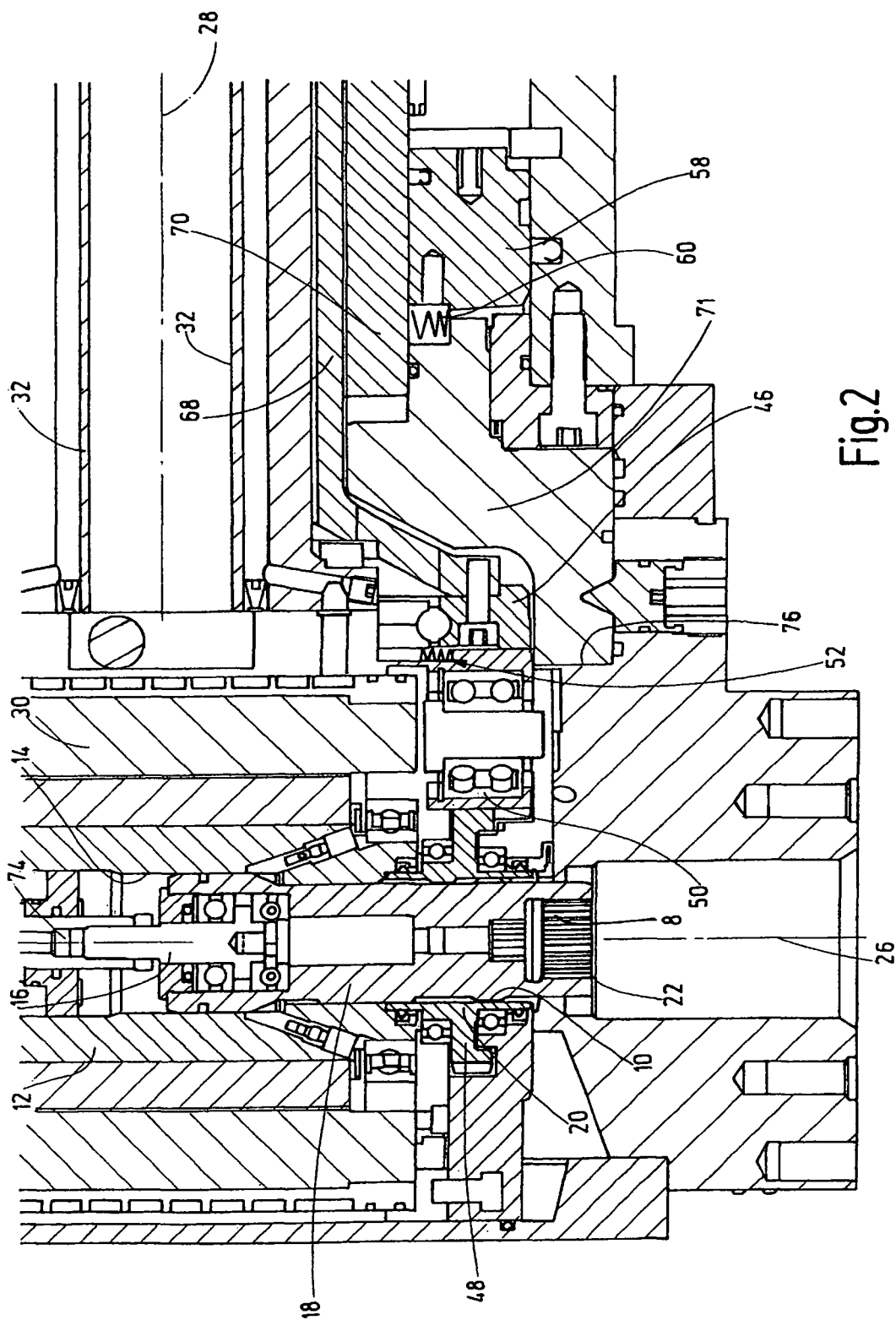
FIG. 2 is a side view in section (drawn slightly larger than in FIGS. 1A and 1B) of just that part of the tool disk that faces the holding mechanism of a machining tool with the adjacent support column, with the operating state of the activated swivel drive of the tool disk being shown.

To transfer the force to the planetary gear 34, the intermediate gearwheel 50 is in meshing engagement with a gear rim 52 found on a collar 46 of a hollow shaft 68. The collar 46 is expanded in the manner of a flange. This hollow shaft 68, which surrounds concentrically the support column 32, has an end that faces away from the collar 46 and is in drive connection with a circumferential housing part 62 of the planetary gear 34 by way of a serration 64 (see FIG. 1B). This planetary gear may be found inside a housing part 56 that is rigidly mounted on the support column 32. This housing part 56 defines together with a rotatable housing part 54 a space for at least one planet wheel 40. In this context, the housing part 54 and the housing part 56 form the inner teeth 36 or 38 respectively. The inner teeth 36, 38, which mesh with the at least one planet wheel 40, have a slightly different number of teeth, so that, in accordance with the Wolfrom gear principle, the rotatable housing part 54 has a much lower speed compared to the input speed of the hollow shaft 68.

The circumferential housing part 54 is connected to the output-side hollow shaft 70, which coaxially surrounds the input-side hollow shaft 68. The hollow shaft 70, which can be driven at the greatly reduced speed, is in turn rigidly connected to a receiver disk 71. This receiver disk 71 has an end 76 that faces the tool disk 2 and is connected to the tool disk 2 to form the swivel drive for this tool disk. To lock the tool disk 2 in a form-fitting manner in the respectively defined swivel position, a locking device 58 is provided in the form of a bolt body. The bolt body can be displaced hydraulically to engage and disengage a Hirth coupling 60 provided between the locking body and the receiver disk 71.

While one embodiment has been chosen to illustrate the invention, it will be understood by those skilled in the art that various changes and modifications can be made therein without departing from the scope of the invention as defined in the claims.

The invention claimed is:
1. A tool turret, comprising
a support column defining a swivel axis;
a tool disk swivelable about said support column moving a machining tool fastened on the tool disk into and out of a machining position of the machining tool;
a drive device having first and second drives connectable to a first and second outputs to drive said tool disk and the machining tool, respectively, by a controllable coupling device, said drive device with said first and second drives and with said first and second outputs being arranged inside said tool disk; and
a gear train arrangement outside said tool disk on said support column, said gear train arrangement being con- nectable to said first output and having an output shaft extending along said support column.

2. A tool turret according to claim 1 wherein said gear train arrangement comprises a Wolfrom planetary gear.

3. A tool turret according to claim 2 wherein hollow shafts extend coaxially relative to said swivel axis along said support column, said hollow shafts forming a drive shaft and an output shaft of said Wolfrom planetary gear, said Wolfrom planetary gear being spaced at a distance from said tool disk.

4. A tool turret according to claim 1 wherein said first and second drives are driven by a common drive shaft of said drive device.

5. A tool turret according to claim 4 wherein an actuating device controls said coupling device to selectively displace the said first drive and said second drive, respectively, at least one of coaxially relative to said drive shaft or parallel relative to said drive shaft.

6. A tool turret according to claim 5 wherein said second drive is arranged coaxially relative to said first drive inside a receiving space in said tool disk.

7. A tool turret according to claim 6 wherein said coupling device is mounted on said drive shaft, is rotationally fixed relative to said drive shaft and is axially displaceably along a longitudinal axis of said drive shaft.

8. A tool turret according to claim 5 wherein said actuating device comprises a hydraulic cylinder surrounded at least in sections by said drive shaft; and said coupling device is movable by said hydraulic cylinder in a first direction to connect said second drive and said second output to enable driving the machining tool, and in a second direction, opposite to the first direction, to connect said first drive and said first output to enable swiveling of said tool disk.

9. A tool turret according claim 1 wherein a locking device secures said tool disk in a defined manner in a predefinable swivel position relative to said support column.

* * * * *